US008807395B2

(12) United States Patent
Schroeder et al.

(10) Patent No.: US 8,807,395 B2
(45) **Date of Patent: *Aug. 19, 2014**

(54) SYSTEM FOR IDENTIFYING FLUID PATHWAYS THROUGH A FLUID CARRYING DEVICE

(71) Applicant: Schroeder Industries, Inc., San Antonio, TX (US)

(72) Inventors: A. A. Jud Schroeder, San Antonio, TX (US); David Santy, Converse, TX (US); Deborah Absalon, Converse, TX (US)

(73) Assignee: Schroeder Industries, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,799

(22) Filed: Mar. 26, 2013

(65) Prior Publication Data

US 2013/0221025 A1 Aug. 29, 2013

Related U.S. Application Data

(63) Continuation of application No. 12/315,249, filed on Dec. 1, 2008, now Pat. No. 8,479,954, which is a continuation of application No. 12/286,441, filed on Sep. 30, 2008, now Pat. No. 8,109,413.

(60) Provisional application No. 61/128,719, filed on May 23, 2008.

(51) Int. Cl.
*B67D 7/06* (2010.01)
*B67D 1/00* (2006.01)

(52) U.S. Cl.
CPC ............ *B67D 1/0084* (2013.01); *B64D 1/0086* (2013.01); *B67D 1/00* (2013.01)
USPC ....................................... 222/144.5; 137/884

(58) Field of Classification Search
CPC ....... B67D 1/00; B67D 1/0084; B67D 1/0086
USPC .......... 222/144.5, 145.5, 145.6, 129.1–129.4, 222/145.1, 148, 484, 630; 137/884, 137/605–607
See application file for complete search history.

(56) References Cited

U.S. PATENT DOCUMENTS

| | | | |
|---|---|---|---|
| 1,627,147 | A | 5/1927 | Clark |
| 1,947,329 | A | 2/1934 | Buttner |
| 2,478,586 | A | 8/1949 | Krapp |

(Continued)

FOREIGN PATENT DOCUMENTS

| | | |
|---|---|---|
| GB | 1 300 072 | 12/1972 |

*Primary Examiner* — Lien Ngo
(74) *Attorney, Agent, or Firm* — Jackson Walker, LLP

(57) ABSTRACT

A beverage dispensing system is disclosed, typical of prior art beverage dispensing systems, in that it is designed to dispense fluids, such as syrup and/or soda and water, from a bar gun. The bar gun is connected by a multiplicity of lines to a manifold and flow control assembly. The manifold and flow control assembly, in turn, receives a number of different fluids, typically syrup, water and soda, under pressure from a number of different pressurized containers. Applicants' novel system includes schematics, typically in the form of adhesive labels, applied to the dispensing system, typically on the manifold and flow control assembly, which schematics illustrate the button arrangement on the handle, and the inlet port layout on the handle, and relate the same, using words, symbols or a combination, to indicia identified ports on the manifold and flow control assembly.

17 Claims, 8 Drawing Sheets

MANIFOLD ASSEMBLY

(56) References Cited

U.S. PATENT DOCUMENTS 2,682,386 A 6/1954 Lindsay
2,887,250 A 5/1959 Zilk
2,937,792 A 5/1960 Firstenerg
3,009,653 A 11/1961 Hedeman
3,013,701 A 12/1961 Joschko
D194,343 S 1/1963 Zilk
3,108,779 A 10/1963 Anderson
3,168,967 A 2/1965 Giampa
3,241,720 A * 3/1966 Barney ............................ 222/23
3,326,520 A 6/1967 Guenther
D216,861 S 3/1970 de Man
3,619,668 A 11/1971 Pinckaers
3,643,754 A 2/1972 Brandin et al.
3,664,550 A * 5/1972 Carothers .................. 222/129.2
3,703,187 A 11/1972 Booth
3,863,810 A 2/1975 Hanson
3,867,962 A 2/1975 Gerrard
3,963,317 A 6/1976 Eigenbrode et al.
4,098,295 A 7/1978 Haylayan
4,162,028 A * 7/1979 Reichenberger ........... 222/129.4
4,196,886 A 4/1980 Murray
4,219,046 A 8/1980 West et al.
4,390,224 A 6/1983 Showman et al.
4,433,795 A 2/1984 Maiefski et al.
D274,031 S 5/1984 de Man
4,469,389 A 9/1984 Grabbe et al.
4,497,421 A 2/1985 Schilling
4,519,635 A 5/1985 McMath
4,619,378 A 10/1986 de Man
4,631,375 A 12/1986 McCann
4,635,824 A 1/1987 Gaunt et al.
4,637,527 A 1/1987 Arrigoni
4,711,374 A 12/1987 Gaunt et al.
4,821,921 A 4/1989 Cartwright et al.
4,921,140 A 5/1990 Belcham
D309,232 S 7/1990 Valiyee et al.
4,986,449 A 1/1991 Valiyee et al.
5,033,648 A 7/1991 Nakayama et al.
5,042,692 A * 8/1991 Valiyee et al. ............. 222/144.5
5,190,188 A 3/1993 Credle, Jr.
5,305,924 A 4/1994 Groover et al.
5,505,337 A * 4/1996 Littman et al. .................. 222/92
5,524,452 A 6/1996 Hassell et al.
5,566,863 A * 10/1996 Mesenbring et al. ......... 222/132
5,649,431 A 7/1997 Schroeder, Jr.
5,725,028 A 3/1998 Cleland
5,873,259 A 2/1999 Spillman
5,909,826 A 6/1999 Credle, Jr.
6,112,946 A 9/2000 Bennett et al.
6,148,681 A 11/2000 Gravel et al.
6,193,114 B1 * 2/2001 Hopkins ....................... 222/330
6,196,422 B1 3/2001 Tuyls et al.
6,260,477 B1 7/2001 Tuyls et al.
6,269,973 B1 8/2001 Bennett et al.
6,322,051 B1 11/2001 Salmela
6,328,181 B1 12/2001 Schroeder et al.
6,394,311 B2 5/2002 McCann et al.
6,405,897 B1 6/2002 Jepson et al.
6,463,753 B1 10/2002 Haskayne
6,644,508 B2 11/2003 Haskayne
6,672,849 B1 1/2004 Martindale et al.
6,698,229 B2 3/2004 Renken
6,722,527 B1 4/2004 Krauss
6,725,687 B2 4/2004 McCann et al.
6,761,036 B2 7/2004 Teague
6,832,487 B1 12/2004 Baker
6,883,685 B2 4/2005 Jones et al.
6,945,070 B1 9/2005 Jablonski
6,988,641 B2 1/2006 Jones et al.
7,021,077 B2 4/2006 Schroeder
7,025,230 B1 4/2006 Salmela
7,048,148 B2 5/2006 Roekens
7,080,937 B1 7/2006 Salmela et al.
7,232,044 B1 6/2007 Salmela
D549,021 S 8/2007 Tuyls et al.
7,266,974 B2 9/2007 Schroeder
7,296,428 B2 11/2007 Cleland
7,305,847 B2 12/2007 Wolski
D560,965 S 2/2008 Sommerfield
7,337,618 B2 3/2008 Wolski
7,337,627 B2 3/2008 Wolski
7,363,962 B2 4/2008 Cleland
7,373,784 B2 5/2008 Haskayne
7,384,073 B1 6/2008 Tuyls et al.
7,448,418 B1 11/2008 Tuyls
7,762,421 B2 7/2010 Fujimura
D626,373 S 11/2010 Valiyee et al.
D626,374 S 11/2010 Valiyee et al.
D626,375 S 11/2010 Valiyee et al.
D628,014 S 11/2010 Martindale
7,931,382 B2 4/2011 Hecht
D638,659 S 5/2011 Martindale et al.
D643,708 S 8/2011 Hecht
D647,785 S 11/2011 Hecht
D648,420 S 11/2011 Hecht
D648,421 S 11/2011 Hecht
D648,617 S 11/2011 Hecht
D648,826 S 11/2011 Hecht
8,479,954 B2 * 7/2013 Schroeder et al. ......... 222/144.5
8,573,254 B2 * 11/2013 Martindale et al. ........... 137/597
2005/0160639 A1 * 7/2005 Smith ............................. 40/316
2008/0135426 A1 6/2008 Hecht et al.
2008/0217357 A1 9/2008 Hecht
2009/0078722 A1 3/2009 Salmela
2009/0090747 A1 4/2009 Tuyls et al.
2009/0145927 A1 6/2009 Salmela et al.
2009/0230148 A1 9/2009 Valiyee et al.
2010/0097881 A1 4/2010 Tuyls et al.
2010/0116842 A1 5/2010 Hecht et al.
2010/0147886 A1 6/2010 Martindale
2010/0314411 A1 12/2010 Tuyls et al.
2011/0057134 A1 3/2011 Martindale et al.
2011/0073617 A1 3/2011 Martindale et al.
2011/0286883 A1 11/2011 Hecht et al.
2011/0315711 A1 12/2011 Hecht et al.

* cited by examiner

MANIFOLD ASSEMBLY

TOP OF HANDLE

SYSTEM FOR IDENTIFYING FLUID PATHWAYS THROUGH A FLUID CARRYING DEVICE

This continuation application claims the benefit of, incorporates by reference, and priority from U.S. patent application Ser. No. 12/315,249, filed Dec. 1, 2008, which claims priority from U.S. Provisional Patent Application No. 61/127,769, filed May 15, 2008.

FIELD OF THE INVENTION

A system for identifying and locating fluid pathways through a fluid carrying device and, more particularly, a system comprising schematics and locating marks or indicia associated with a fluid carrying device having a multiplicity of separate channels therethrough, including schematics for identifying the location of specific lines, ports, and buttons associated with specific fluid sources and channels through the fluid carrying device.

BACKGROUND

Dispensing systems, such as beverage dispensing systems, typically include a multiplicity of fluid sources, for example, cylinders containing a variety of different pressurized syrups, pressurized soda, and water under pressure.

Dispensing systems typically engage the multiplicity of pressurized fluid containers to carry the pressurized fluid through a flow control assembly, a manifold, with a multiplicity of lines carrying fluid from the manifold to a bar gun assembly. The bar gun assembly has a multiplicity of buttons for controlling a multiplicity of valves therethrough, for dispensing a beverage into a container. The beverage typically is comprised of syrup mixed with soda, water mixed with another beverage, or just soda or just water alone. Typically dispensing systems are known in the art.

It is seen that fluid dispensing systems typically provide for a line from each of the multiplicity of pressurized fluid bearing containers to a flow control and manifold assembly. The multiplicity of separate and distinct fluids is maintained in separate and distinct channels through the manifold and manifold and flow control assembly, and separate and distinct fluid bearing lines that connect the manifold and flow control assembly to the bar gun handle. Moreover, the separate fluids are maintained in separate channels within the handle of the bar gun assembly, which separate channels have separate valves, controlled by separate buttons, associated therewith. At the nozzle end of the handle, separate or mixed fluids are dispensed into a container.

OBJECTS OF THE INVENTION

It is an object of the present invention to provide information relating to channel, line, port, and button location and pattern, such information associated with structural elements of a dispensing system so as to assist in operating or troubleshooting when using, maintaining or repairing elements of the system.

SUMMARY OF THE INVENTION

A beverage dispensing system is disclosed, typical of prior art beverage dispensing systems, in that it is designed to dispense fluids, such as syrup and/or soda and water, from a bar gun. The bar gun is connected by a multiplicity of lines to a manifold and flow control assembly. The manifold and flow control assembly, in turn, receives a number of different fluids, typically syrup, water and soda, under pressure from a number of different pressurized containers. Applicants' novel system includes schematics, typically in the form of adhesive labels, applied to the dispensing system, typically on the manifold and flow control assembly, which schematics illustrate the button arrangement on the handle, and the inlet port layout on the handle, and relate the same, using words, symbols or a combination, to indicia identified ports on the manifold and flow control assembly.

A fluid dispensing system has a bar gun assembly that includes a handle with a multiplicity of inlet ports arranged generally in a plane and having an inlet port layout, and a multiplicity of buttons arranged in a second plane and having a button layout. The fluid dispensing system also has a manifold and flow control assembly having a multiplicity of separate fluid channels therethrough, the manifold and flow control assembly having a flow control assembly and a manifold assembly. The flow control assembly also has a multiplicity of inlet ports for receiving fluids from a multiplicity of fluid sources. The manifold assembly has inlet ports for receiving fluid from the flow control assembly. Separate channels connect the inlet ports of the flow control assembly to the inlet ports of the manifold assembly.

A multiplicity of lines is provided for connecting the inlet ports of the manifold to the inlet ports of the bar gun assembly. Indicia on the manifold and fluid dispensing assembly locate and distinguish the multiplicity of separate fluid channels therein from one another. An inlet port schematic on the manifold and fluid dispensing assembly illustrates where each fluid line associated with each fluid channel and port connects to the handle. A button layout schematic illustrates where each button associated with the control of each fluid associated with each line and each fluid channel is located, for example, with respect to the rest of the buttons.

Applicants also provide for a system for identifying fluids moving separately from one another via multiple paths through a fluid carrying device. The fluid carrying device includes a flow control assembly having multiple inlet ports, including at least a first and second inlet port, for receiving at least a first and second fluid from a first and second fluid source. The flow control assembly may be typical of the prior art, having a multiplicity of outlet ports, including at least a first and a second outlet port, with the first and second outlet ports of the flow control assembly in fluid communication with the first and second inlet ports of the flow control assembly, respectively. The flow control assembly further includes a multiplicity of flow control valves, including at least a first and a second flow control valve for controlling the flow of the first and second fluid between the first and second inlet ports and the first and second outlet ports, respectively. A manifold assembly is provided having a multiplicity of inlet ports, including at least a first and second inlet port, the manifold assembly being adapted to removably engage the flow control assembly such that the multiplicity of inlet ports and the multiplicity of outlet ports of the flow control assembly sealingly and releasably engage. The first and second inlet ports of the manifold assembly align with the first and second outlet ports of the flow control assembly, the manifold assembly also has a manifold cover.

A multiplicity of fluid lines engage the inlet ports of the manifold assembly. The multiplicity of fluid lines include at least a first and a second fluid line, the multiplicity of fluid lines engage the manifold assembly such that each of the manifold inlet ports, including the first and second inlet ports of the manifold engages each of the inlet ports, including first and second fluid lines, in a fluid sealing manner.

A bar gun assembly is adapted to receive the multiplicity of fluid lines in fluid sealing relation. The bar gun assembly has a handle with a body including a heel portion, the heel portion having a multiplicity of inlet ports arranged in a bar gun inlet port layout. The multiplicity of inlet ports engage the multiplicity of fluid lines. The multiplicity of bar gun assembly inlet ports, include at least a first and a second inlet port, engage the first and second fluid lines. The handle includes a multiplicity of fluid channels therethrough, the multiplicity of channels including at least a first and a second fluid channel. The first and second fluid channels engage the first and second inlet ports.

The bar gun assembly further typically includes a button assembly for operating a multiplicity of valves, the button assembly including a multiplicity of buttons arranged in a button layout. The multiplicity of buttons include at least a first and a second button to engage a first and a second valve of the multiplicity of valves. The bar gun assembly further includes a nozzle for receiving fluids from the multiplicity of fluid channels, including the first and second fluid channel, and for mixing at least the first and the second fluids.

Generally, the flow control assembly typically includes a flow control valve identifying member associated with each of the multiplicity of flow control valves. The manifold or fluid control assembly typically includes a manifold inlet port mark or indicia associated with the location of each of the multiplicity of inlet ports. The manifold typically includes a first schematic representation, the first schematic representation representing the bar gun inlet port layout. The manifold typically also includes a second schematic representation, the second schematic representation representing the button layout of the bar gun. The schematics may be on the cover of the manifold.

DETAILED DESCRIPTION OF THE PREFERRED EMBODIMENTS

Applicants' system for identifying fluid pathways through a fluid carrying device includes and is applied to a manifold and flow control assembly 12 that is engaged to a bar gun assembly 14 through a multiplicity of fluid lines 16, typically enclosed within a sheath 21.

Figure 1:
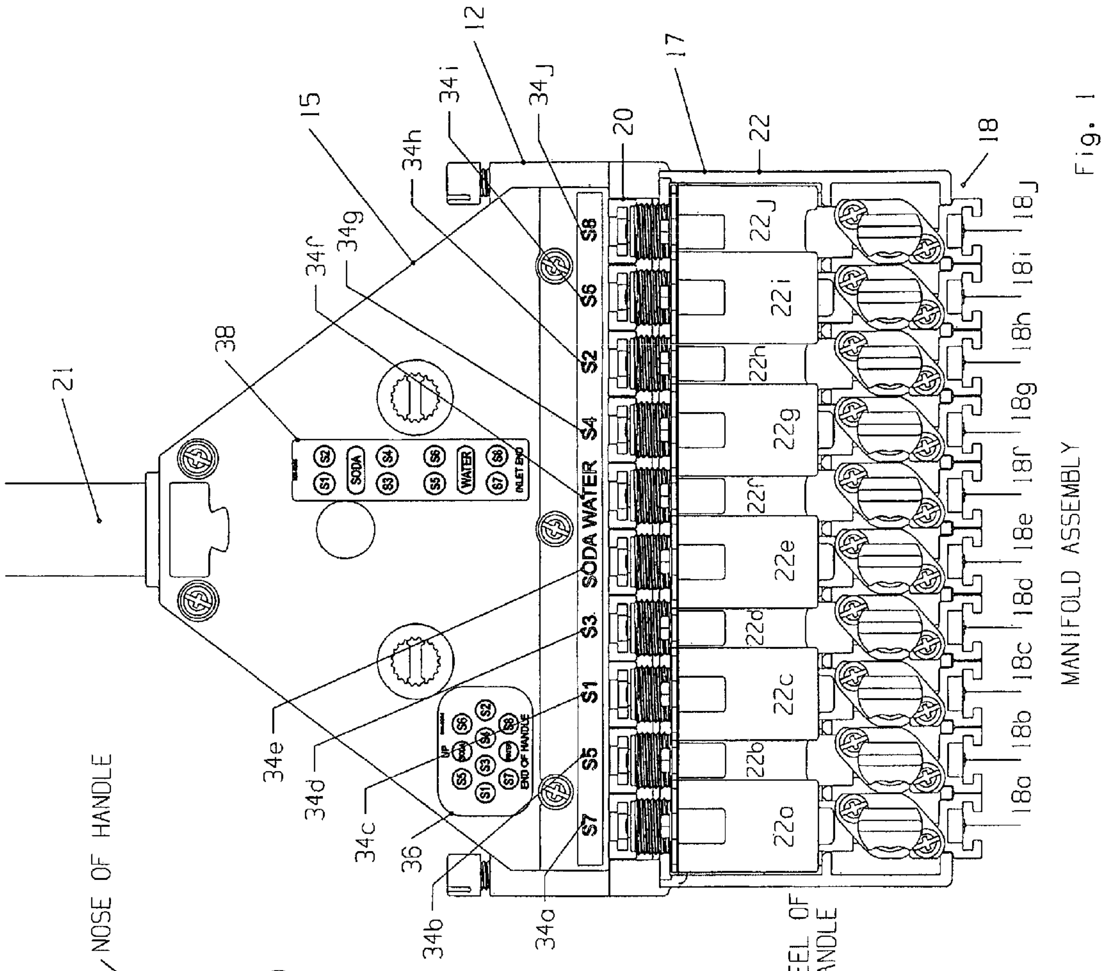
FIG. 1 is a top elevational view of the manifold and flow control assembly.

Manifold and flow control assemblies are known in the art as are bar gun assemblies and fluid lines for connecting the manifold and flow control assemblies to the bar gun assembly. Thus, a dispensing system typically comprises a multiplicity of fluid sources (not shown) typically pressurized. These sources are engaged through lines in a manner known in the art to manifold and flow control assemblies, such as that illustrated in FIG. 1. Manifold and flow control assemblies are designed to receive the separate lines from the fluid sources and to engage the same, through a manifold to a multiplicity of separate fluid lines 16 and on to the bar gun assembly 14.

The separate fluids are maintained through separate channels in the manifold and flow control assembly and the bar gun assembly until dispensed from the nozzle of the bar gun assembly through the operation of buttons on the bar gun assembly in a manner known in the art.

Turning now to FIGS. 1-5, it is seen that the manifold and flow control assembly 12 is comprised of a manifold assembly 15 and a flow control assembly 17. Flow control assembly 17 is typically comprised of a multiplicity of inlet ports, a multiplicity of outlet ports, and a multiplicity of flow control valves for controlling the flow rate (mechanically, by automatic adjustment or other ways) of the pressurized fluid to the manifold assembly. The manifold assembly 15 may releasably engage the flow control assembly 17 typically includes a multiplicity of inlet ports which are adapted to fluidly seal with the multiplicity of fluid lines 16.

An inlet port assembly 18 on the flow control assembly is defined by a multiplicity of inlet ports, here ten, designated 18*a*-18*j*, each of which inlet port is adapted, in manners known in the art, to engage a separate line from a separate pressurized fluid source. The flow control assembly may also contain an outlet port assembly 20 defined by a multiplicity of individual outlet ports, here ten, designated 20*a*-20*j*. Between each of the individual inlet ports and each of the individual outlet ports, a flow control valve assembly 22 is provided with the multiplicity of individual flow control valves, here designated 22*a*-22*j*.

Pressurized fluid provided at each of the individual ports 18*a*-18*j* is controlled by an individual valves 22*a*-22*j* in a variety of ways known in the art and provides fluid flow control at each of the multiplicity of individual outlet ports 20*a*-20*j*.

The manifold 15 includes an inlet port assembly 24 comprised of individual inlet ports, here ten, designated 24*a*-24*j*. Inlet port assembly 24 removably engages outlet port assembly 20 in ways known in the art. A multiplicity of lines, here ten, designated 16*a*-16*j* is provided for connecting to the multiplicity of inlet ports 24*a*-24*j* to carry the separate fluid flow controlled fluids to an inlet port assembly 28 typically on the heel of bar gun assembly 14. Inlet port assembly 28 is comprised of an arrangement of inlet ports, here ten, designated 28a-28j, for engaging the appropriate line of the multiplicity of lines 16a-16j.

Button assembly 30 is provided comprised of a multiplicity of separate buttons, here ten, designated 30a-30j. In ways known in the art, the buttons control valves, the valves associated with channels of fluid flow through the bar gun. Here, there is a button associated with a valve and a valve associated with each of the different fluid channels. Buttons 30a-30j correspond to the separate and distinct fluids flowing through the various channels defined by the ports, the lines, and the walls of the fluid flow device.

Flow control valve identifying members 32a-32j will have a letter, symbol, number, word or a combination thereof. The words, such as soda, water, Coke, Sprite, etc., may identify a liquid flowing through the valve by its commonly understood term. A letter may also, such as O for orange, L for lime. A unique symbol, such as S2, S6 or M, may designate a liquid whose nature and identity would be discovered through the identification of the cylinder associated with each valve or an index key. That is to say, flow control valve identifying members 32a-32j may be specific and have a literal message that will identify the nature of the fluids flowing through or general, which would typically require knowledge from the source of the liquid as an indexed key to determine the nature of the liquid being handled by that particular valve.

Indicia locating separate and distinct channels, here adjacent inlet ports on the manifold assembly or ports on the flow control assembly, are placed close to or adjacent to the individual ports thereby identifying and distinguishing their position. Collectively, port identification indicia is referenced 34 and may include an adhesive label. The individual fluids will be identified by the indicia carrying a numeral, letter, a combination of the same or a word, which word may actually identify the nature of the fluid flowing through. In the illustrated embodiment, there are up to ten fluids capable of being handled by the dispensing system. The port locating indicia are identified as 34a-34j (see FIGS. 1 and 5). Soda and/or water are typically carried through dispensing systems and indicia 34e and 34f carry the terms "soda" and "water" to identify the ports associated therewith, by placement of those words, here on the manifold, in the illustrated embodiment, directly adjacent the ports that carry these fluids. In the illustrated embodiment, indicia 34a, 34b, 34c, 34d, 34g, 34h, 34i, and 34j all contain general alphanumeric symbols, here S1-S8, to identify the location of the port and to distinguish the fluid flowing therethrough from the other fluids. Some, all or no ports may have generalized such symbols. Some, all or no ports may have specific terms—Coke, Sprite, soda, water, orange, grape, etc.

Fluid lines 16a-16j are connected to ports of the manifold and engage the inlet ports of the bar gun. Each line will carry, typically at or near one or both ends, indicia identical to that found on the associated port locating indicia 34a-34j. These indicia may be referred to as fluid line marks, indicia or markers.

Figure 6:
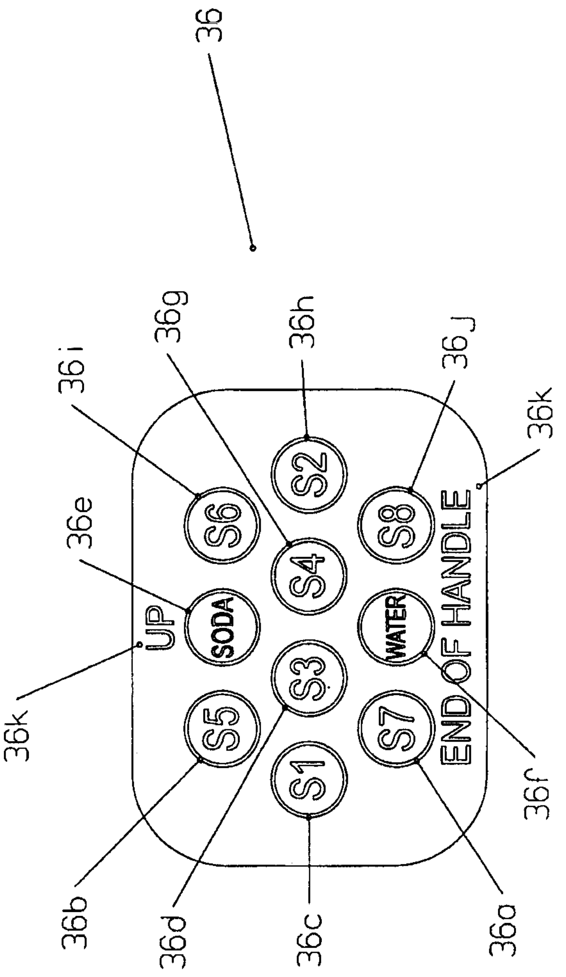
FIG. 6 is a schematic of Applicants' system which represents the location of the various ports associated with the various fluid lines from the manifold and flow control assembly positionally with the one port with respect to the other ports as well as informationally illustrating which inlet ports are associated with which buttons of the button assembly and which buttons of the button assembly with which elements of the manifold and flow control assembly.

Element 36 is a schematic, such as a label with a set of inscriptions or inscriptions applied directly to a workpiece, the schematic reflecting the bar gun assembly inlet port layout. Inlet port schematic 36 typically identifies, by location, vis-à-vis one another, the proper placement of the lines connecting the ports on the manifold assembly to the inlet ports of the bar gun, that is, lines 16a-16j. That is to say, inlet port schematic 36 will represent the pattern defined by the multiplicity of ports and will further represent the proper placement of the line that is associated with a particular individual fluid carried in the line to the inlet ports. The schematic typically approximates the size of the inlet port layout or arrangement, but is not necessarily (but may be) to an approximately 1 to 1 scale. Moreover, further information 36k may be provided on schematic 36 to indicate that it represents structure located at the "end of the handle" and further such information may designate the pattern orientation, such as "up," as seen in FIG. 6. Inlet port schematic 36 typically provides information (S1-S8, soda and water, for example) to show where to place an individual line such that an inlet port of the manifold is engaged to that particular port by reflecting, here through the use of circles, a shape similar to each port and such shape spaced from adjacent ports to reflect the layout of the actual physical inlet port assembly 24. Further information 36k may include the orientation and or location of the layout with respect to the handle, here by the further information provided "up" and "end of handle."

It will be further understood that the various different channels through the bar gun assembly are supplied by the multiple inlet ports and are associated with valves controlled by the buttons of the button assembly in a manner or manners known in the art. A further schematic representation of the bar gun assembly button layout is provided, which bar gun assembly button layout schematic 38 will illustrate with multiplicity of indicia 38a-38j, graphical representations of the buttons and their positions vis-à-vis one another. Indicia 38a-38j also carry the indicia found on schematic inlet port layout 36 as in 36a-36j which also corresponds also to the indicia 34a-34j. Thus, indicia on the manifold and flow control assembly, here 34a-34j locates channels or ports with lines, here 16a-16i, which lines connect the inlet ports, which ports engage channels operated by buttons and use the same indicia as schematics 36 and 38. This provides diagnostic, maintenance and service information to the user so he may easily distinguish the channel/button from inlet at the manifold and flow control assembly 12 and through the button assembly.

In short, the dispensing system identifies the location of structural elements in the manifold and flow control system with symbols and/or words adjacent thereto. These symbols or words are repeated at least on a schematic representing the inlet port layout of the bar gun and a schematic representing the button layout. Typically the symbols same or words identifying ports/channels will be placed at both ends of the fluid lines. Further, fluid identifying information may be placed on or near the flow control valves. Thus, by the position of a button among a button layout, a user can trace or find the associated line, inlet port, and flow control valve and manifold port. Further, by indicia on the buttons one may identify the fluid associated therewith.

While the schematics are typically found on the manifold cover, one or more may be placed in addition to or in this location. One or more schematics may be placed on or attached to other elements of the dispensing system. One or both schematics may be placed on the bar gun handle or the sheath carrying the fluid lines, for example. The schematics (one or both) may be remote to the dispensing system, as on a website or in a manufacturer's catalog or manual. Schematics may be represented by graphics on a label applied by using an adhesive or any other suitable manner. Schematics may be applied by silk screen or other similar ways directly to one or more elements of the dispensing system. The port identifying indicia may be on the flow control assembly, such as on caps 27 (see FIG. 5), clips 29, or a separate member mounted, for example, just above the clips, but visible when the flow control assembly and the manifold are engaged.

Figure 4:
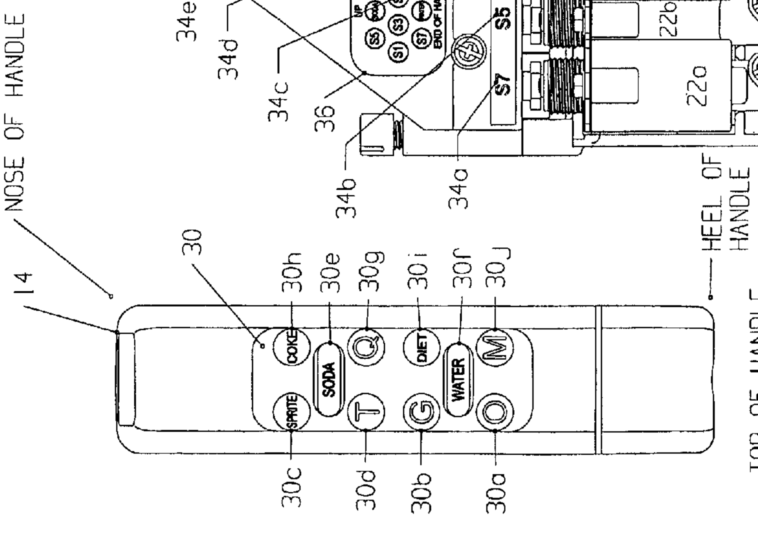
FIG. 4 is a top elevational view of the bar gun assembly illustrating a button assembly thereon.
Figure 2:
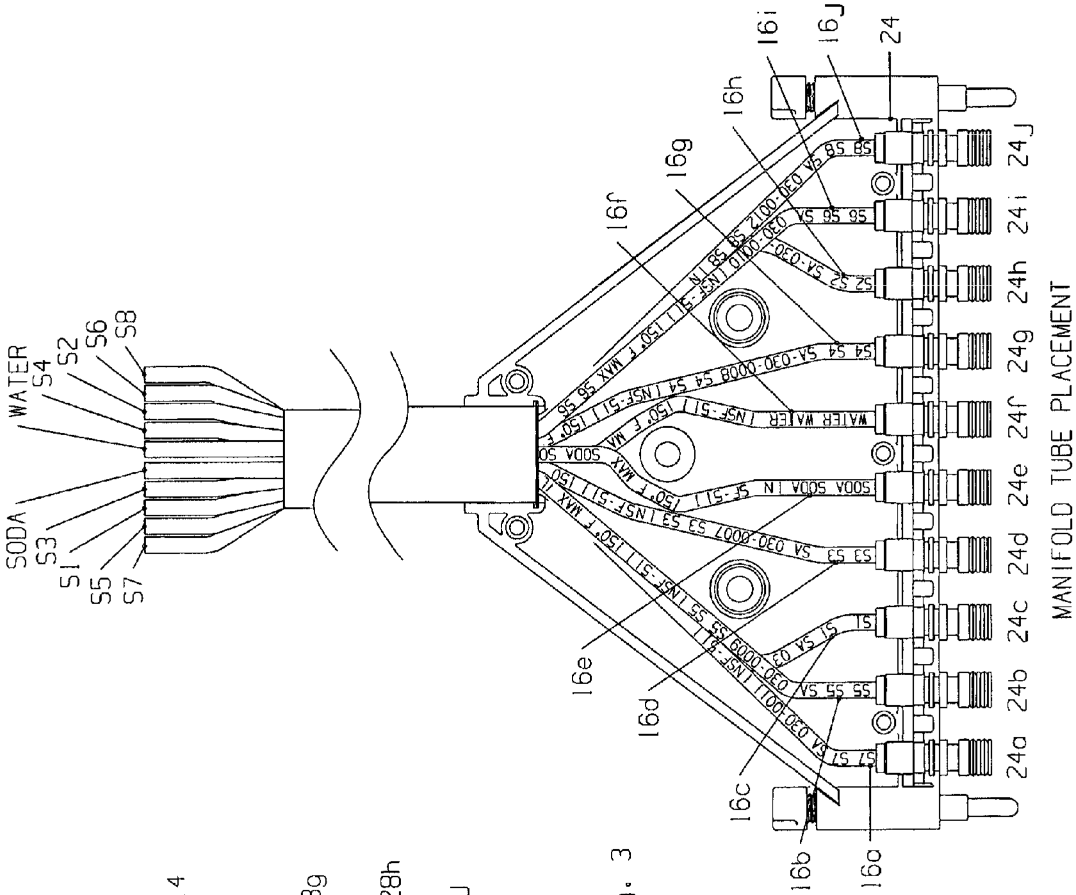
FIG. 2 is a top elevational view of the manifold of the manifold and flow control assembly with the top cover removed therefrom to illustrate the manner in which the multiplicity of inlet ports of the manifold engage a multiplicity of separate fluid bearing lines.
Figure 3:
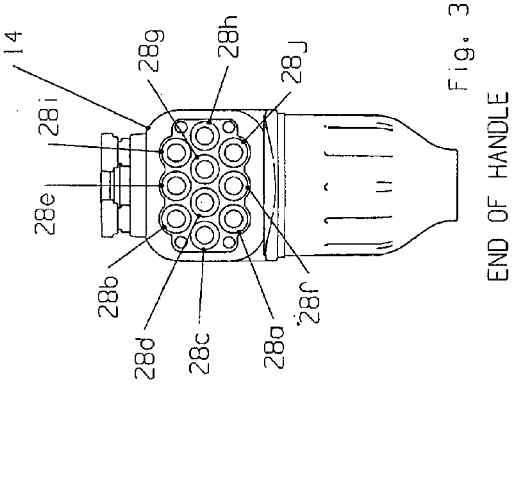
FIG. 3 is an elevational view of the end of the bar gun assembly and illustrates an inlet port assembly and a button assembly on a bar gun assembly.
Figure 5:
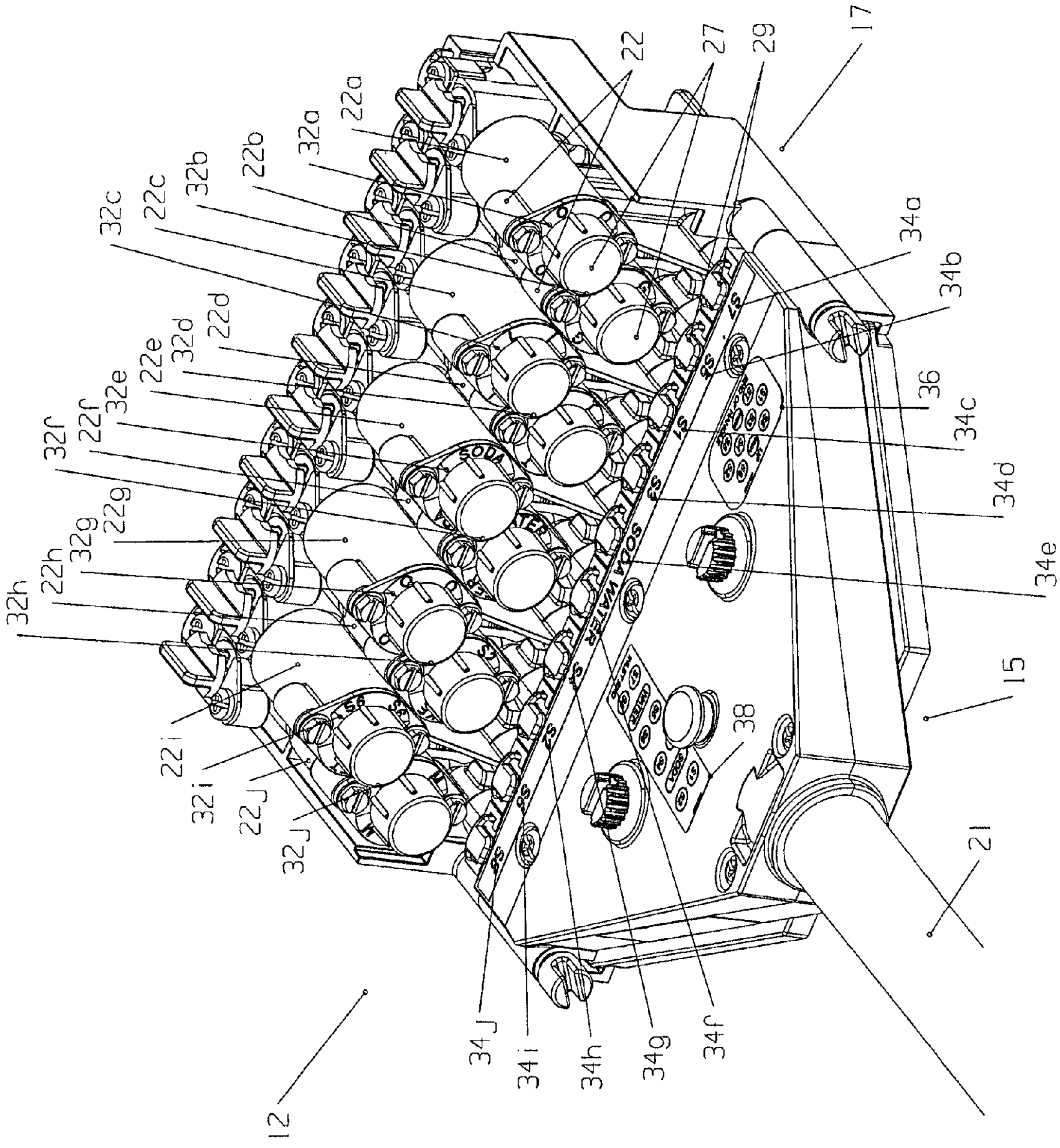
FIG. 5 is a top front perspective view of the manifold and flow control assembly illustrating elements of Applicants' system as they engage the manifold and flow control assembly.

The flow control valve of the flow control assembly 17 may include a multiplicity of flow control valve members, here ten, designated 32a-32j, each member associated with each valve 22*a*-22*j*, so as to be close to the valve or on the valve so it is immediately apparent that the member and the indicia thereon identifies, with the symbol or word or otherwise, unique from the other members, a fluid flowing therethrough that may be a different fluid from the other valves. For example, it is seen in FIG. 4 that the following flow control members and buttons carry the following symbols:

| Valve Members | Symbol on Button/ Flow Control | Fluid Type | Port/Line/Button Designation |
|---|---|---|---|
| 32a | O or Orange | Orange syrup | S7 |
| 32b | G or Grape | Grape | S5 |
| 32c | Sprite or L | Sprite | S1 |
| 32d | Tonic or T | Tonic | S3 |
| 32e | Soda | Soda | Soda |
| 32f | Water | Water | Water |
| 32g | Quinine or Q | Quinine | S4 |
| 32h | Coke | Coke | S2 |
| 32i | Diet | Diet Coke | S6 |
| 32j | Root Beer or M | Root Beer | S8 |

Applicants correlate on schematics specific parts (on manifold and flow control assembly), inlet ports (on handle) to the buttons. Indicia may correlate in any way in which will allow the user to recognize which button/port/line/valve will carry the same fluid. For example, if the system is intended to handle six different fluids, indicia might be simply 1-6 for the six buttons; 1-6 for the six ports of the manifold and flow control device. The actual buttons when viewed on the handle may look like this:

| | | |
|---|---|---|
| | (handle nose) | |
| ○ | | ○ |
| | ○ | |
| ○ | | ○ |
| | ○ | |
| | (handle heel) | |

The schematics might look like this for this button layout:

| | | |
|---|---|---|
| 1 | | 2 |
| | 3 | |
| 4 | | 5 |
| | 6 | |

The schematics might look like this for the inlet port:

| | | |
|---|---|---|
| | UP | |
| 1 | 2 | 3 |
| 4 | 5 | 6 |
| | End of Handle | |

The port identification indicia (placed adjacent ports) might look like this:

| | | | | | |
|---|---|---|---|---|---|
| 1 | 2 | 3 | 4 | 5 | 6 |

Lines connecting the numbered ports would carry the proper number. The valve on the flow control may carry a 1-6 designation or the term describing the actual fluids; Coke, Diet Coke, Root Beer, Sprite, water and juice, example. Because the flow control valve is aligned with the numbered ports, it will be apparent, if "Coke" is aligned with port numbered "1", what fluid is being carried with ports/line/buttons carrying the number "1".

Typically, however, there are certain recognized words in industry-conventional words, like soda, water, Coke, Pepsi, Sprite, etc. Some buttons will typically reflect these words, but when a first customer is ordering a dispensing system, they will often desire different button arrangements for different syrups, than a second or third customer. In fact, Applicants provide over 200 different buttons, for example, buttons carrying single letters (sometimes against different color backgrounds), two letter combinations (again, sometimes against different color backgrounds), full words (Coke, Diet, Cherry, Slice, tea, etc.), contractions or abbreviations ("rbeer," "straw," "bmary," "mtdew") or just colored buttons with no words or symbols. As one can imagine, tens of thousands of combinations are possible, even for a three button system ($200^3$). Applicant, however, has reduced the multiplicity of combinations needed for schematics by using common schematic designations—for example S1-S8, soda and water for a ten button combination. Thus, Applicants needs only stock S1-S8 marked lines (and a "water" as well as a "soda"), a single port label, a single button schematic, and a single inlet port layout schematic. This is regardless of which ten button combination (with soda and water being two chosen buttons) is chosen by the customer. Once the customer chooses the buttons, they are arranged on the handle during assembly of the bar gun, the schematics are put in place and, when the system is assembled, the customer refers to the bar gun buttons for connecting the proper lines from the handle and from the different fluid sources to the different manifold and flow control assembly ports.

Thus, Applicants have reduced tens of thousands of possible schematic designations, to just a few by designating specific button locations in an array, to common ports, lines and valves.

Figure 8:
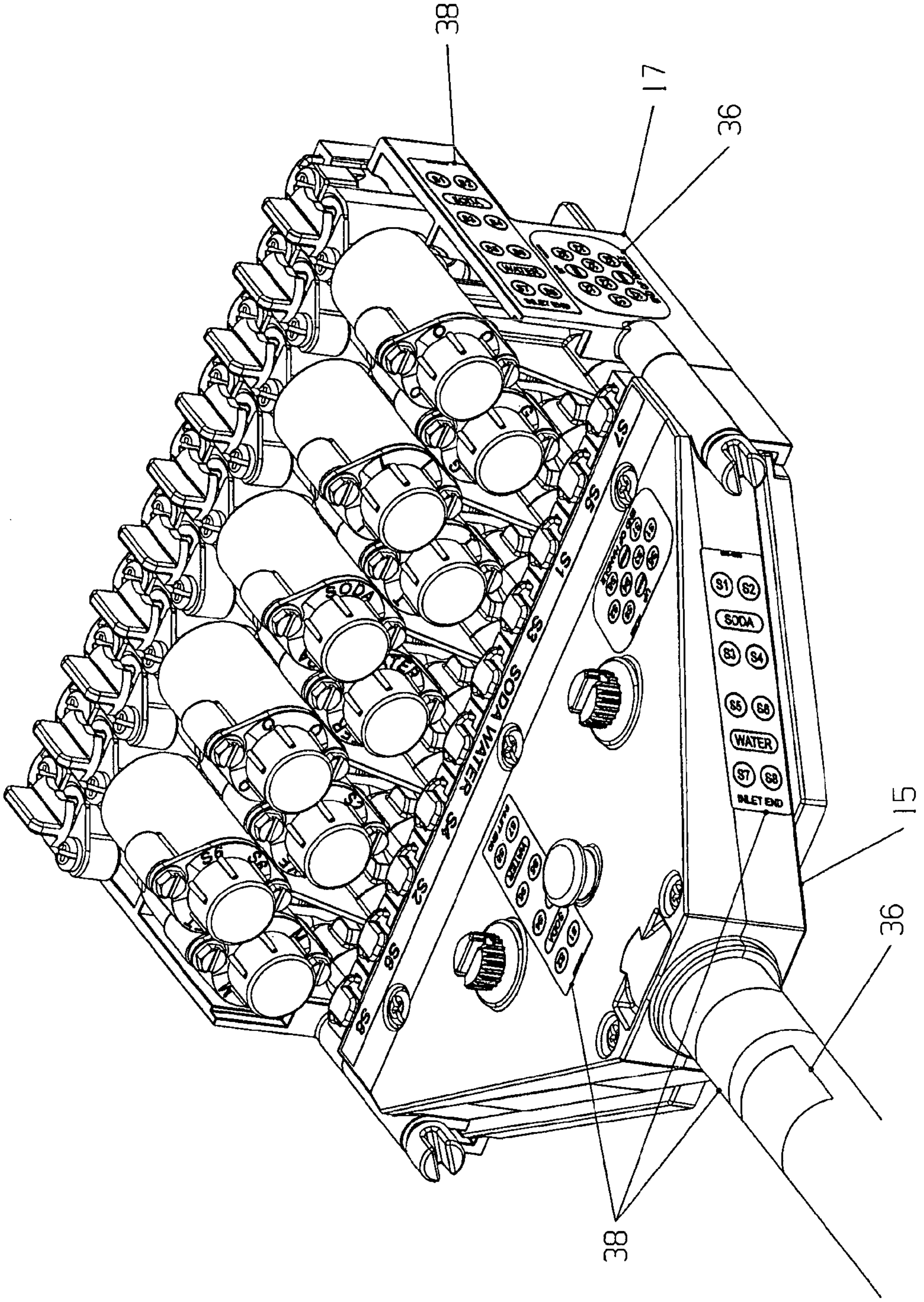
FIGS. 8, 9, and 10 illustrate a manifold and flow control assembly in perspective views illustrating various locations for placement of one or more of the schematics, labels and other information representing at least a part of Applicants' device and system.
Figure 9:
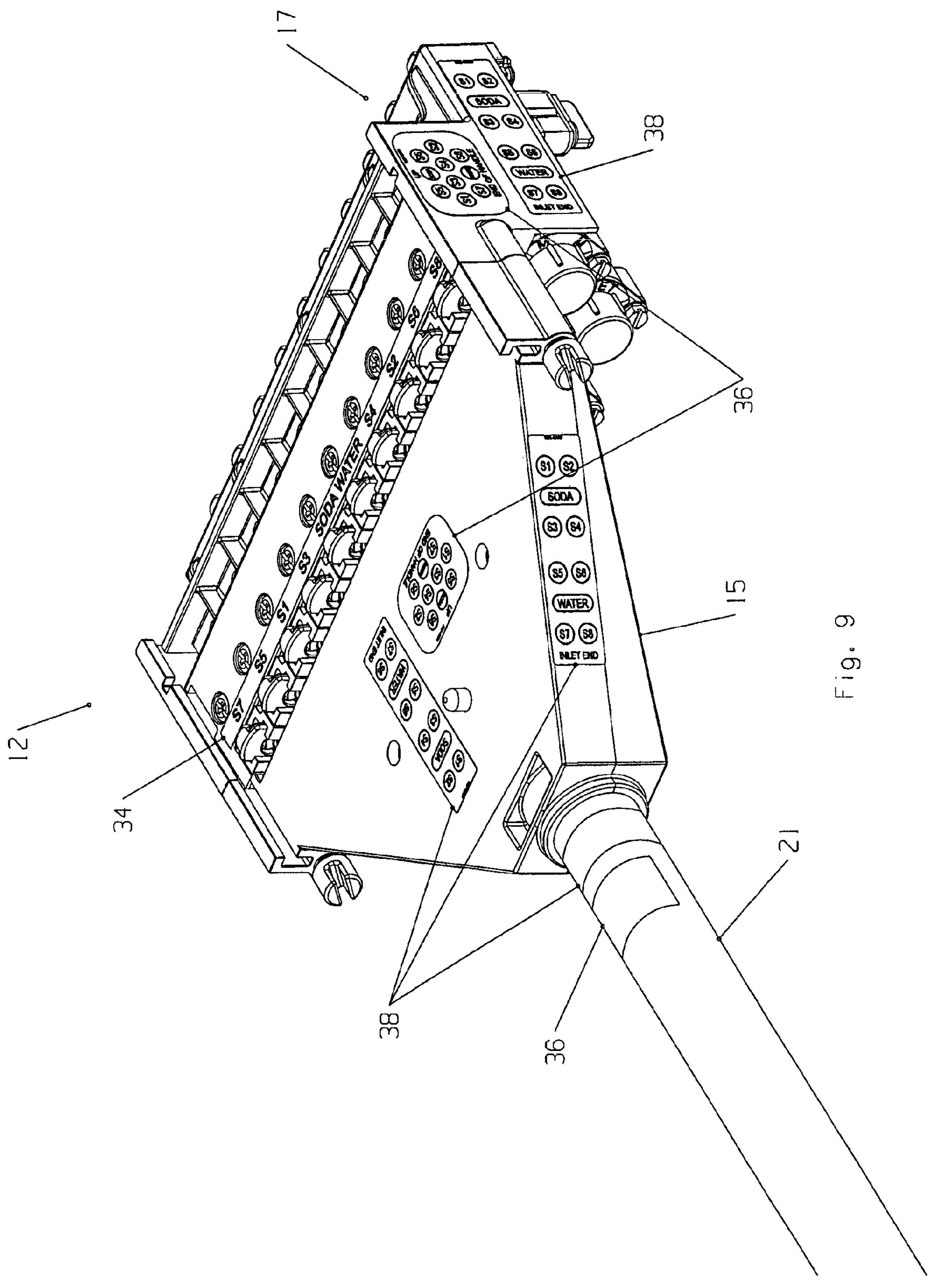
Figure 10:
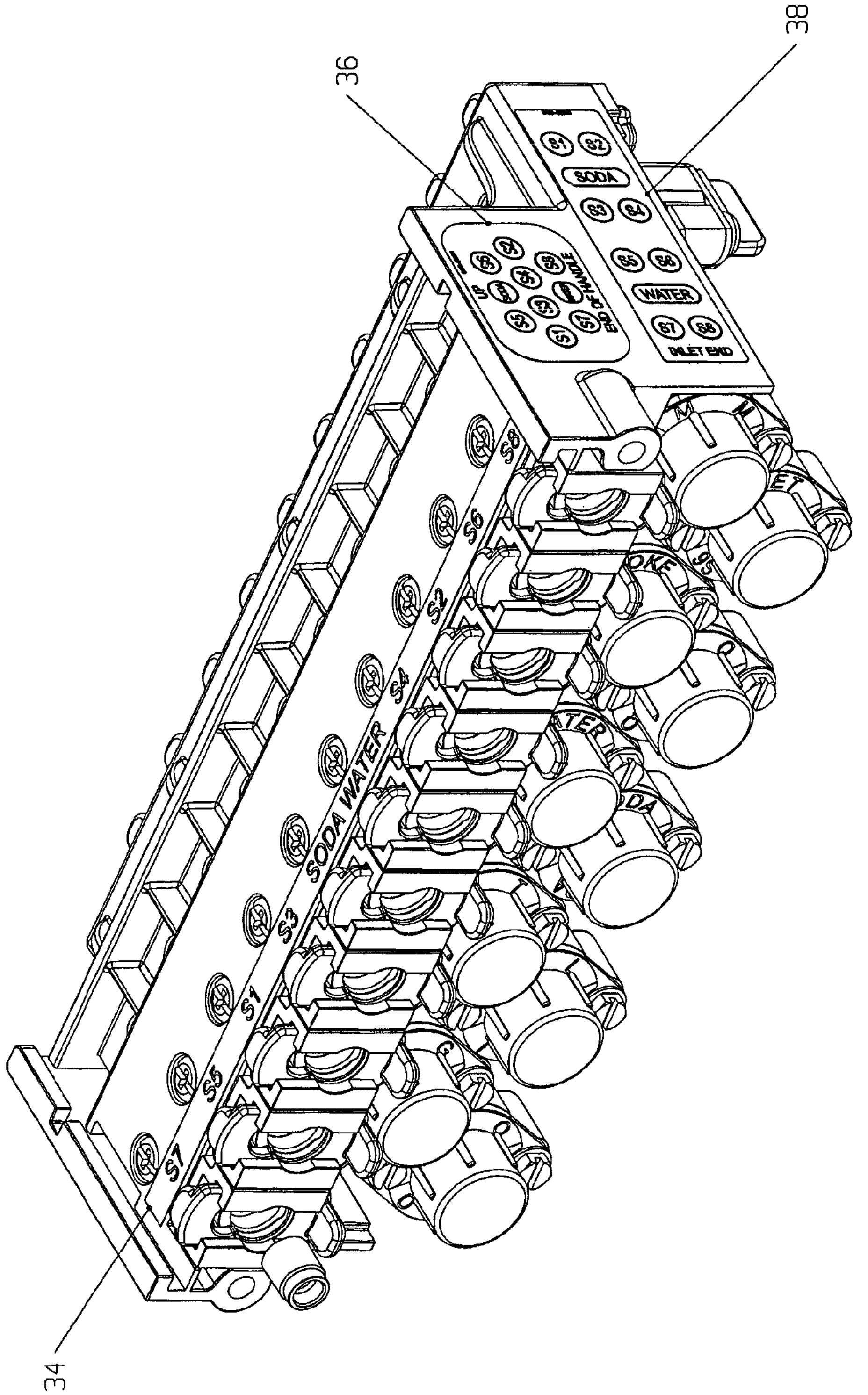

FIGS. 8, 9, and 10 illustrate a manifold and flow control assembly in perspective views illustrating various locations for placement of one or more of the schematics, labels and other information representing at least a part of Applicants' device and system. It is seen, for example, with respect to FIGS. 8, 9, and 10 that port identification indicia may be located on the flow control assembly 17, again adjacent the separate and distinct ports 34*a*-34*j*, collectively representing port identification indicia 34. That is to say, FIG. 8 illustrates port identification indicia 34 on the cover of the manifold assembly 15 adjacent the ports thereof. FIGS. 9 and 10 illustrate the use of port identification indicia 34 on the flow control assembly side of the unit again placed so as to associate a symbol or word with a specific port. These figures also show the placement of one or more schematics on the sheath—either end or between the ends of the sheath. These figures also show that one or more of the schematics may be used both by placement in one or more places on the dispensing system, and off of the dispensing system. For example, the button layout schematic typically with its symbols that differ, at least in part from the symbols on the actual buttons, may be placed at least in one or more of the following locations on the dispensing assembly: bar gun sheath, manifold or flow control assembly. Likewise, the schematic that illustrates using symbols, typically at least some of which are different than the symbols on the buttons, may be placed anywhere on the assembly. One schematic may even be placed on one or more elements of a dispensing system than the other. Further, one or more schematic may be on the dispensing system and, in addition, carried in a manual, website, catalog or the like associated with the particular system.

Note the position of the buttons alone will, when looking at the button layout schematic, tell the user what ports and lines are associated with that button location. Thus, if there is a problem or a flavor needs to be changed, the user knows the lines and the ports (at both bar gun end and manifold end) that require attention. That is to say, button position correlates to inlet ports, manifold ports, lines and also typically flow control valves.

In the initial setup of the dispensing system, a customer may order a button arrangement such as that illustrated in FIG. 4. With the identification system set forth herein, the dispensing system may be assembled properly, the customer knowing which fluid source to attach to which inlet port on the flow control assembly, and which lines to attach to the handle inlet ports.

The embodiment illustrated shows ten channels/lines/ports and buttons, associated with up to ten different fluid sources. Indicia is located positionally on or adjacent one or more of the following elements: bar gun inlet ports, bar gun buttons, ports of the manifold and flow control assembly and fluid lines. At least one, and typically two, schematics are provided, typically removed from the layout represented: button layout and inlet port layout. However, the same identification and location system may be applied to any dispensing system having two or more buttons, and two or more separate fluid bearing sources. Further, while a ten button system is illustrated, it may be used with less than ten fluid sources, in ways known in the art. The term alphanumeric symbol as used herein may be one or more letters, one or more numbers or a combination thereof.

In a preferred embodiment, the schematics are placed on the manifold and flow control assembly such that when the manifold and flow control assembly is mounted to a support surface (on or near a bar, for example), the schematics are visible to the user without the need for disassembling any parts of the dispensing system.

Figure 7:
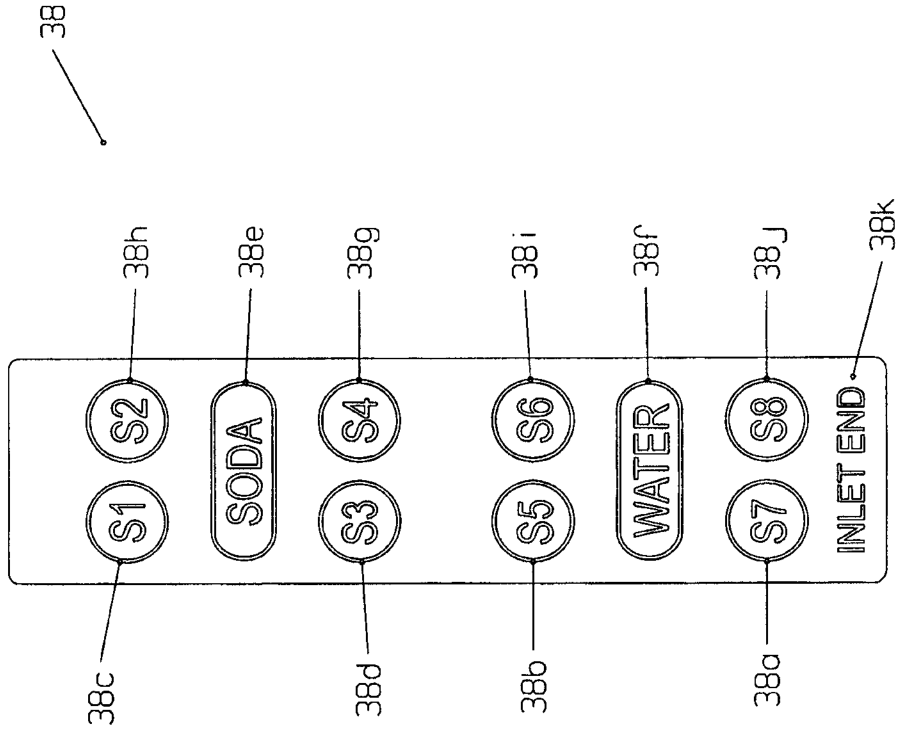
FIG. 7 illustrates another schematic, this associated with the layout of the buttons of the button assembly, including buttons location vis-à-vis other buttons of the button layout and button identification indicia to illustrate which buttons operate which valves associated with which inlet ports and which ports of the manifold flow control assembly.

In a preferred embodiment, a method of using Applicants' system is disclosed. For example, a customer purchasing a dispensing system may designate a bar gun button layout choosing from a first multiplicity of button designations or provide button designations himself. The dispensing system manufacturer will then take that physical button layout, for example, a ten button arrangement as set forth in FIG. 4, and replicate it on a schematic as, for example, as set forth in FIG. 7, which schematic uses all, some or none of the indicia appearing upon the individual buttons. What indicia does appear on the button schematic layout will typically be repeated at least in the inlet port layout and typically on the lines and ports on the manifold and flow control assembly.

In a preferred embodiment, designations common to the two schematics and the ports are used, which common designations represent a number of different possible indicia on the buttons.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims.

The invention claimed is:

1. A beverage dispensing system with a bar gun having multiple buttons in a button layout and for receiving a multiplicity of fluid lines at inlet ports, the inlet ports having an inlet port layout, the bar gun coupled to a manifold and control assembly at least through the fluid lines, the manifold and control assembly having distinctive indicia designated multiple flow controlled fluid paths therethrough, each flow controlled fluid path engaging one of the fluid lines, bar gun inlet ports, and buttons, the manifold and fluid control assembly comprising:

an information schematic representation label of the inlet port layout of the bar gun that identifies the physical location of the inlet ports each with respect to the other and further uses the distinctive indicia of the multiple flow controlled fluid paths to identify which inlet port is receiving fluid from which flow controlled fluid path.

2. The beverage dispensing system of claim 1, wherein the fluid dispensing device further includes a second schematic representation label located remote from the bar gun, the second schematic representation representing the button layout of the bar gun.

3. The beverage dispensing system of claim 2, wherein the second schematic representation label is located on the manifold and control assembly.

4. The beverage dispensing system of claim 2, wherein at least some of the buttons of the bar gun have marks.

5. The beverage dispensing system of claim 4, wherein some of the multiplicity of buttons have alphanumeric symbols thereupon and others of the buttons have words thereupon.

6. The beverage dispensing system of claim 5, wherein the button layout schematic label carries the same words associated with the words of the buttons having words, and different symbols than the alphanumeric symbols associated with the buttons having alphanumeric symbols.

7. The beverage dispensing system of claim 4, wherein the button layout schematic label carries different marks for the associated buttons than the marks associated with at least some of the buttons.

8. The beverage dispensing system of claim 1, wherein the fluid lines each include a fluid line mark thereon corresponding to the distinctive indicia of the flow controlled fluid path with which the fluid line is engaged.

9. The beverage dispensing system of claim 8, wherein the fluid lines comprise a first end and a second end, and a fluid line mark comprises at least two fluid line marks, one near the first end and one near the second end of the associated fluid line.

10. The beverage dispensing system of claim 1, wherein the schematic representation label of the fluid inlet port layout of the bar gun is presented on an adhesive label.

11. A beverage dispensing system comprising: a bar gun having multiple buttons in a button layout and for receiving a multiplicity of fluid lines at inlet ports, the inlet ports having an inlet port layout; and a manifold and control assembly coupled to the bar gun at least through the fluid lines, the manifold and control assembly having distinctive indicia on a label on a surface thereof showing designated multiple flow controlled fluid paths therethrough; wherein each flow controlled fluid path engages one of the fluid lines, bar gun inlet ports, and buttons, and the fluid lines each include a fluid line mark thereon corresponding to the distinctive indicia of the flow controlled fluid path with which the fluid line is engaged;

wherein the beverage dispensing system further comprising an information schematic representation of the fluid inlet port layout of the bar gun that identifies the physical location of the inlet ports each with respect to the other and further uses the distinctive indicia of the multiple flow controlled fluid paths to identify which inlet port is receiving fluid from which flow controlled fluid path, the information schematic being located remote from the bar gun;

wherein the schematic representation of the inlet port layout of the bar gun is presented on an adhesive label;

wherein the adhesive label is coupled to the manifold and control assembly.

12. The beverage dispensing system of claim 11, wherein the fluid lines comprise a first end and a second end, and the fluid line mark comprises at least two fluid line marks, one near the first end and one near the second end of the associated fluid line.

13. The beverage dispensing system of claim 11, further comprising a second schematic representation located remote from the bar gun, the second schematic representation representing the button layout of the bar gun.

14. The beverage dispensing system of claim 13, wherein at least some of the buttons of the bar gun have marks.

15. The beverage dispensing system of claim 14, wherein some of the multiplicity of buttons have alphanumeric symbols thereupon and other of the buttons have words thereupon.

16. The beverage dispensing system of claim 15, wherein the button layout schematic carries the same words associated with the words of the buttons having words, and different symbols than the alphanumeric symbols associated with the buttons having alphanumeric symbols.

17. The beverage dispensing system of claim 13, wherein the button layout schematic carries different marks for the associated buttons than the marks associated with at least some of the buttons.

* * * * *